United States Patent Office 3,248,262
Patented Apr. 26, 1966

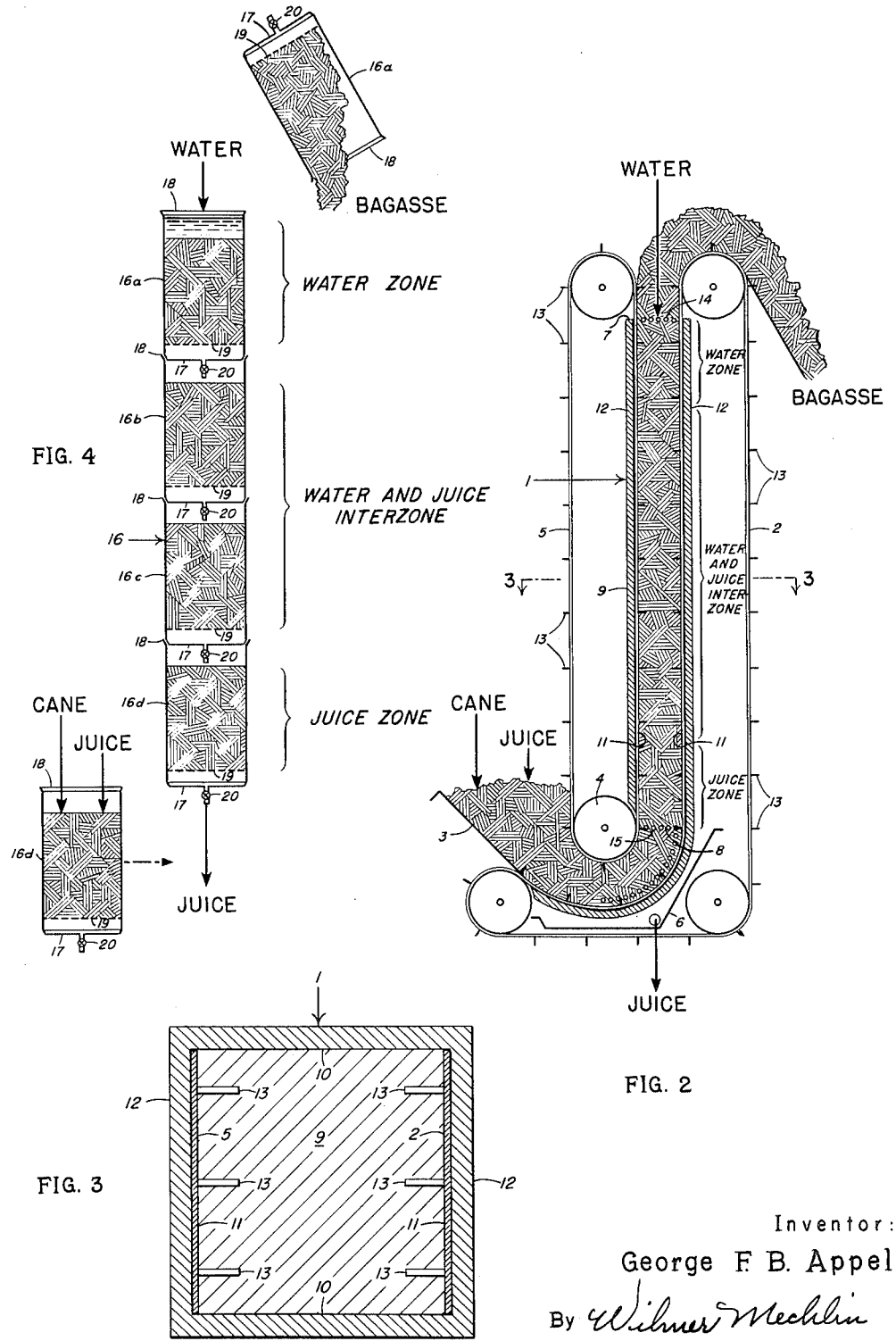

3,248,262
JUICE EXTRACTION BY HYDRAULIC
DISPLACEMENT
George F. B. Appel, Kaneohe, Hawaii, assignor to Honolulu Iron Works Company, Honolulu, Hawaii, a corporation of Hawaii
Filed Aug. 17, 1962, Ser. No. 217,580
9 Claims. (Cl. 127—43)

This invention relates to the extraction of sugar and other natural juices from juice-yielding plant matter by hydraulic displacement.

Derived from sugar cane and, to a lesser extent, sugar beets, sugar in the natural state is dissolved in water and contained in cells in the particular substance or plant matter. The process for extracting the juice or aqueous sugar solution from the plant's cellular structure that most readily suggests itself is to press or squeeze the plant with sufficient force to rupture the sugar-containing cells and express the juice, and this is the basic method that, in the case of sugar cane, is now used practically universally. Sugar cane generally has a lower sugar content and at present is more difficult to process than sugar beets. The cane or stalk has many vascular bundles or transport vessels each containing xylem by which water and nutrients are conducted from the roots to the leaves, phloem through which the products of photosynthesis pass from the leaves throughout the plant and small surrounding fiber cells. The liquid in these vascular bundles is of low sugar concentration and low purity but in the cane about the bundles are large storage cells or parenchyma in which rich juice of high concentration and purity is found. It therefore is in the extraction of juice from the storage cells that the sugar cane industry is mainly interested and from these cells that practically all of the sugar produced by the industry is obtained.

Extraction of the juice by pressure even from the storage cells of sugar cane presents the problem that the bagasse or solid part of the cane has a high affinity for the juice even when compressed under very heavy pressure. As a result, the imposing train of huge mills seen in a typical sugar mill for successively crushing the cane under high pressure between heavy rolls is alone incapable of extracting more than 80 percent to 85 percent of the rich juice from the cane. To better this yield, the cane is macerated by adding water in the course of the crushing and the crushing thereafter continuing until the bagasse has been substantially dewatered. This combination of pressing and macerating increases the yield of juice to about 98 percent but only by diluting it below its rich, natural state to such an extent that over one-third of the volume extracted is added water, with corresponding increase in the cost of eliminating the water by evaporation at a subsequent stage in the production of the sugar in solid form.

Even though the extraction of sugar juice by crushing and macerating is now the universal practice in the sugar cane industry, its shortcomings have long been known and as far back as 1929 were described vividly by Francis Maxwell, one of the industry's leading engineers, as follows: "Excessively long trains of the bagasse units are unquestionably most impressive to behold, but in action they are somewhat reminiscent of the cave age—sheer brute force; huge wearing masses of metal, vast amounts of power and enormous pressures. In the light of experience we may well ask ourselves if repeated bludgeoning, as here, of such a frail thing as a stalk of fiber is the most economical means of attacking the problem of extraction. Scientific examination of the factors in question seems, to some of us, to show conclusively that it would be most rational to apply persuasive rather than forceful means to induce the juice to leave its cellular abode."

In keeping with Maxwell's criticism, two "persuasive" processes for extracting sugar juice without use of a "long train of bagasse units" have been tried with some measure of success. One is a straight washing in which the juice-yielding substance, after being crushed or otherwise disintegrated to rupture or break open its juice-containing cells, is repeatedly washed until substantially all of the juice in the ruptured cells has been carried away with the wash water. The other, known as diffusion, also makes use of water and requires some preliminary disintegration to increase the area exposed to the action of the water, but depends for extraction primarily upon the imbalance of the sugar concentrations in the juice and the water to produce movement through the porous or semi-permeable membranous walls of the juice-containing cells. This movement, previously supposed to be entirely of sugar molecules, is now thought to be an osmotically and hydrostatically induced countermovement of the water and juice as a result of the forming of openings in the cell walls sufficiently large to pass the juice by the partial destruction of the pores by heat at the elevated temperature at which the diffusion process is customarily conducted. In addition to the elevated temperature, the diffusion process requires a thorough mixing of the water with the substance, exposure of the substance to progressively more dilute water as its own sugar concentration decreases and time for the diffusion to complete itself to the point where substantially all of the sugar has been extracted. However, diffusion, when conducted under the proper conditions, dilutes the extracted juice to a considerably lesser extent than washing, with resultant greater economy in subsequently removing the added water by evaporation. Diffusion therefore is more practical than washing for extracting sugar juice and, while not applied commercially to sugar cane, is now widely used in extracting juice from sugar beets.

Other "persuasive" processes for extracting sugar juice have been proposed, among them those contained in the early patents to DeLime, U.S. Patent No. 97,059, of 1869, and Chapman, British Patent No. 12,021, of 1889. Each of these patents purports to disclose a process in which, by subjecting previously crushed or otherwise disintegrated sugar cane to water under pressure, the juice can be extracted in substantially its natural, undiluted state; and Chapman at some length ascribes this result to the principle of displacing one liquid by another. It is not known whether the DeLime process was ever tried, but Chapman's was unsuccessful when attempted to be applied to sugar beets. The reaction of the sugar industry to such hoary proposals as these is evident from its continued use up to the present time of the time-honored process of pressing and macerating for extracting juice from sugar cane, despite that processes' obvious shortcomings.

The primary object of the present invention is to provide a "persuasive" process for extracting natural juice from plant matter, wherein the available juice contained in cells ruptured by shredding or other preliminary disintegration of the plant matter is substantially completely displaced by water and, by control of the process length, can be extracted over a given time interval either in its natural, undiluted state or substantially uniformly diluted, thereby eliminating or holding within predetermined limits the content of such water in the extracted juice.

Another object of the invention is to provide a process for extracting natural juice from plant matter by hydraulic displacement of the juice from ruptured cells of the plant matter which can be conducted continuously or on a batch basis and in either case enables the juice available in such cells to be substantially completely extracted either without dilution or diluted within a predetermined range.

An additional object of the invention is to provide a process for extracting natural juice from plant matter, whereby it is possible to extract all the available juice contained in previously ruptured cells of the plant matter by displacing the juice from the cells by water without dilution of the juice.

A further object of the invention is to provide a process for extracting sugar juice from a sugar juice-yielding substance, wherein the juice is displaced from previously ruptured cells of the substance by relative countermovement of the substance and water with the rate of relative movement so controlled as to produce either no net movement of the water relative to the apparatus in which the displacement is conducted or a predetermined net movement in or counter the direction of movement of the substance, thereby enabling regulation both of the water content of the extracted juice and of the juice content of the substance as it leaves the apparatus.

Another object of the invention is to provide a process for extracting sugar juice from a sugar juice-yielding substance by hydraulic displacement of the juice from ruptured cells, wherein the conditions under which the process is conducted are so controlled as to minimize mixing of the juice with and diffusion of the sugar into the water, produce distinct zones of water and juice separated by an intermediate water and juice zone, and contain all or at least a portion of the intermediate water and juice zone within the displacement apparatus, thereby enabling the juice available in ruptured cells of the substance to be extracted either without dilution by the water or diluted within a predetermined range.

Another object of the invention is to provide a process for extracting sugar juice from a sugar juice-yielding substance, whereby by disintegrating the substance to rupture juice-containing cells, substantially completely displacing the juice available in the ruptured cells by water and subsequently pressing or otherwise removing at least part of the water from the substance, substantially all of the juice available in the ruptured cells is extracted in a form of a given richness and the substance is made available as a fuel or for other suitable purpose.

Other objects and advantages of the invention will appear hereinafter in the detailed description but particularly pointed out in the appended claims and be illustrated in the accompanying drawings in which:

FIGURE 2 is a somewhat schematic view of an apparatus suitable for use as the hydraulic extractor in the process of FIGURE 1 for enabling the process to be performed continuously;

FIGURE 3 is a horizontal sectional view on an enlarged scale taken along lines 3—3 of FIGURE 2; and FIGURE 4 is a somewhat schematic view of apparatus suitable for the hydraulic extraction in the process of FIGURE 1, when the process is conducted on a batch basis.

Figure 1:
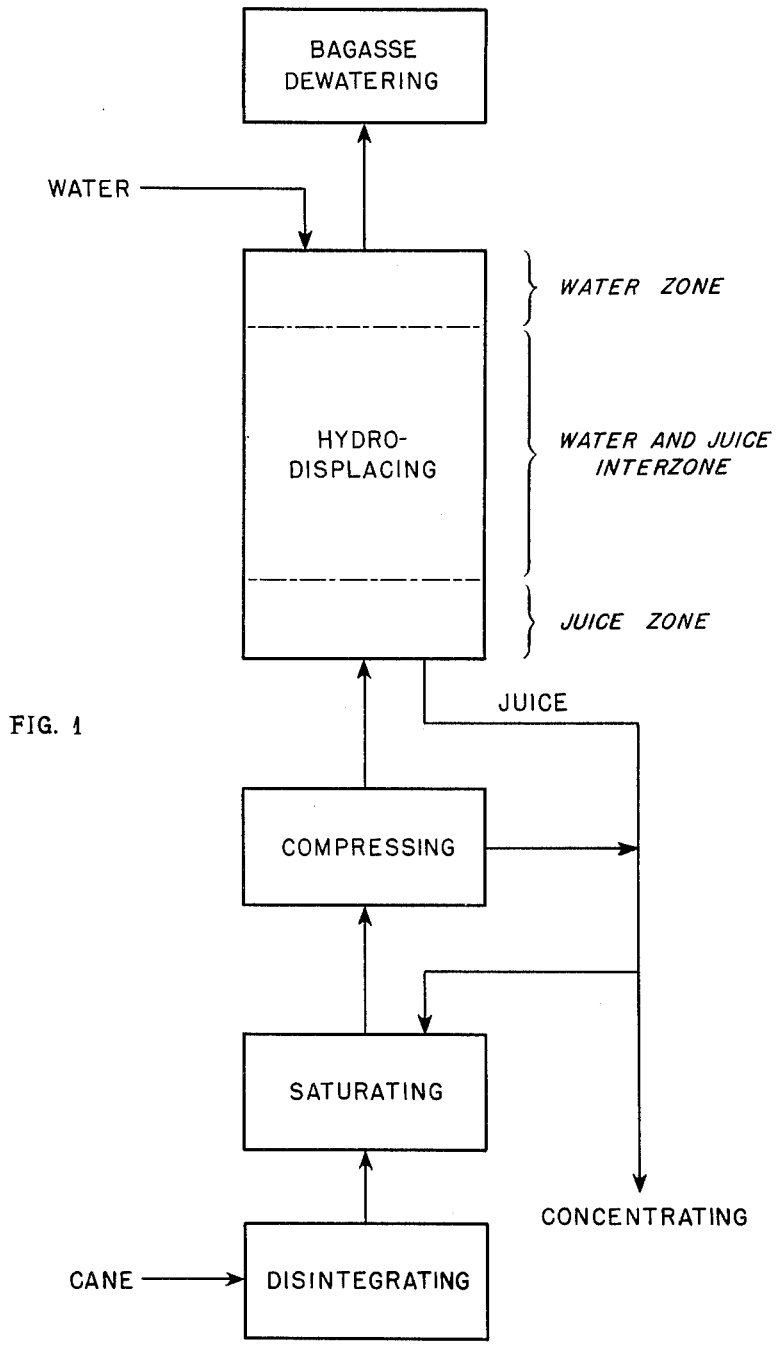
FIGURE 1 is a flow sheet of a preferred embodiment of the process of the present invention.

The improved process of this invention of extracting juice by hydraulic displacement, can extract natural juice from other juice-yielding flora or plant matter but is particularly useful in extracting juices as to which its economic advantages over extraction processes now employed are most pronounced. A typical and probably the outstanding example of such a juice is sugar juice, whether obtained from sugar cane or sugar beets. However, as between sugar cane and sugar beets, the former not only is the source of the bulk of the sugar produced throughout the world but, as now processed for juice, requires machinery that entails a large initial capital investment and is costly to operate and maintain. It therefore is in connection with sugar juice and especially with juice obtained from sugar cane that the process will be described as exemplary of the invention.

The present invention rests remotely upon the principle, mentioned in the Chapman patent, that one liquid can be displaced from a space by another liquid under pressure. However, unlike Chapman, it recognizes that sugar juice is an aqueous solution of sugar and that, with water as the medium in which the sugar is dissolved in the natural state, an attempt to displace the juice from ruptured cells by water presents the seemingly impossible task not merely of displacing one liquid by another with which the first is completely miscible but in effect of displacing a liquid by itself. I have now found, in applying water under pressure to a sugar juice-yielding substance previously disintegrated to rupture its juice-containing cells, that, while, as expected, it was impossible to obtain a sharp interface between the water and the juice due to their complete miscibility, it, nonetheless, was possible to produce between them an interface or, more strictly, an interzone or intermediate zone of water and juice which was of some length but was finite and measurable in its boundaries or ends. It is the latter finding and further findings as to control of the interzone, including among others the substantially uniform increase in the sugar concentration in the interzone from substantially zero at its water end to substantially that of the rich juice at its juice end, that are directly responsible for the ability of the process of this invention to extract juice hydraulically either without or limited in dilution.

The basic steps in the process of this invention are the disintegration of the juice-yielding substance to rupture or break open the cells containing the bulk or substantially all of the juice, the application of water to the disintegrated substance such that the water will pass through the substance and displace the juice from the ruptured cells, and the withdrawal of the juice at a point, position, or location in advance of that at which the water is applied. With these, its basic steps, the process has as its crux the containing of the interzone separating the displacing water from the rich or undiluted juice, preferably in whole and at least in part, in the space, distance, or length between the points at which the fluid is applied and the juice withdrawn, so that the point of withdrawal of the juice will be in advance of the water.

The containing or containment of the interzone, at least in part, in the space of length, sometimes hereinafter termed "displacement or displacement process length," between those points, not only is the crux or basic essential of the present process, but its achievement, in fitting the displacement length to the length of the interzone, entails control or regulation to the extent possible of the conditions responsible for the initial, minimum length of the interzone and any subsequent growth in that length. Conceivably, the problems occasioned by the interzone might be reduced by using as the displacing fluid, instead of water, a liquid or gas relatively immiscible with the juice. However, such fluids are invariably more expensive than water and those that might contaminate the juice would make it imperative that the interzone be contained entirely within the displacement length. Such gases as compressed air or steam would eliminate contamination but, along with other gases, would be relative inefficient in displacing the juice due to the greater affinity of the fiber for the juice. Thus, as the practical matter, only water will ordinarily be usable as the displacing fluid in extracting sugar juice by displacement on a commercial scale.

Even though, in the hydro- or hydraulic displacement, the interzone is contained within the displacement length, the juice withdrawn from the process will be diluted to an unpredictable extend below its rich concentration in the natural state if part of the water or the interzone is free to channel through the substance to the point of withdrawal of juice. It therefore is desirable, and if the juice is to be obtained either without dilution or diluted within a predetermined limited range, essential that both the water and the interzone solution be blocked against such channeling by and force to act against a solid wall, column, or front composed of a substantially stable, uniformly dense framework, labyrinth, or maze of solid particles of the disintegrated substance and a liquid entirely filling the open or accessible interstices or voids within and between those particles and together with the latter extending entirely across the path through the substance to the juice outlet. Conversely, in order to displace all of the juice from the ruptured cells and other open voids in the solid matter, it is essential that those voids be filled completely with water within the water zone. Like juice being the only liquid that initially can fill the open voids or interstices in the disintegrated substance without dilution of the juice displaced from the fill the open voids or interstices in the disintegrated substance without dilution of the juice displaced from the cells, the process preferably includes, as a step preliminary to the displacement, saturation of the disintegrated substance to fill any open voids with righ juice obtained later in or part earlier in the process. As an additional preliminary step, the process also preferably includes compaction of the solid particles or fiber into a stable or "frozen" framework or labyrinth of substantially uniform density.

The manner in which the preliminary saturating and compacting or compressing steps prevent channeling of the water or the water and juice solution in the interzone through the disintegrated substance during the subsequent displacement of the juice, requires an understanding of the nature of the cane or other substance after it has been disintegrated or prepared to rupture its juice-containing cells. Using cane as an example, the prepared cane at that stage is a heterogeneous mixture of solid liquid and gas or, specifically, pieces or particles of fiber, juice and air. Due to the affinity of the fiber for the juice this mixture or mass can absorb a considerable additional quantity of juice before it becomes saturated, but even when so saturated, will contain numerous air pockets. The air in the pockets, in large part, would be more readily displaceable than the juice by a liquid under pressure, but any bubbles that were blocked in their escape would prevent movement of the liquid into the space they occupied. Too, the looseness and lack of uniformity in the distribution of the solid or fiber particles throughout the mixture would render the individual particles subject to displacement by the displacing liquid and prevent the fiber structure formed by the particles from uniformly resisting the liquid's flow. Consequently, were an attempt made to displace the juice from the prepared cane without further preliminaries, channeling of the displacing liquid through the cane would be almost inevitable with resultant dilution of the juice extracted.

On the above basis, the saturating herein contemplated is not merely an adding to the mixture of all the juice it can absorb but is the substantial filling of all of the open voids in the substance to rid it of air pockets. In turn, the compressing or compacting contemplated in the compressing step is not a compressing of the mixture into a very dense, practically impermeable mat, such as a sugar mill would produce, it being desired that the flow of the displacing liquid through the disintegrated cane, while uniformly resisted, be as free or unrestrained as possible in order that the displacement of the juice may proceed quickly and efficiently. Instead, the contemplated compressing of the mixture, or more precisely of the fiber content of the mixture is simply a compressing of it into a mat, blanket or mass substantially uniform in its density and resistance to flow of the displacing liquid in which mat the fiber particles are substantially evenly distributed and to inhibit their individual displacement, knit or joined together by the applied pressure into a stable but open framework or skeleton through which the liquid is comparatively free to flow. As the disintegrated cane is more readily saturated when its density is at a minimum, the saturating step ordinarily will precede rather than follow the compressing step.

The basic process, with the above prefered addenda and the addition of a final step in which the substance after displacement of the juice, is dewatered for use as a fuel or for other suitable purpose, is represneted by the flow sheet shown in FIGURE 1. If, instead of the sugar cane indicated on the flow sheet, sugar beets are the raw material from which the exemplary sugar juice is to be extracted, the disintegrating step can be conducted by slicing or otherwise disintegrating the beets to rupture their juice, containing cells. As in the case of the sugar beets, the extent to which the sugar cane is disintegrated to prepare it for the subsequent fluid displacement of the juice determines the limits of the extraction, since it is only the juice in the ruptured or open cells that is available for the displacement. The distribution of the juice in the cane is not uniform, some being contained in the small cells of the vascular bundles. However, in terms of sugar content, such cells probably contain less than 1 percent of the total sugar juice in the cane. It therefore is disintegration of the cane to rupture or break open the storage cells, about the vascular bundle, which contain over 99 percent of the sugar, that is of interest here.

In disintegrating the cane, any device which can break down the fibrous structure to the extent required to rupture or break open substantially all of the storage cells can be used for preparing the cane for the fluid displacement, devices among those now available suited for the purpose being rotating knives, swing hammer shredders, and crushing rollers.

In the next step in the process, saturating, rich, raw or undiluted juice, conveniently obtained from the later hydraulic displacement step, is added to the extent sufficient to remove any air and fill the open voids, interstices or pores within and between the solid particles into which the cane or other sugar juice-yielding substance has been disintegrated, the addition advantageously being accompanied by mechanical mixing of the juice with or vibration of the substance to help in releasing the entrapped air. In principle, there will be no difference in the saturating step, whether the process as a whole, in terms of the displacement step, is conducted as a continuous or a batch operation. In either type of operation, the disintegrated material can be led from the disintegrating device directly into the rest of the process, as by discharging it from the device onto an endless belt or like suitable conveyor, or it can be stored temporarily in a suitable bin to allow for fluctuations in the supply of the raw material and moved as needed by a drag slat conveyor or like suitable means to the point at which the saturating juice is applied. For substantial uniformity in density later in the process, it is desirable that the material, either before saturation or before compression, be leveled to a substantially uniform thickness and this is conveniently accomplishable by a leveling rake, carding roll, or like suitable device.

After being saturated, the disintegrated material is compressed or compacted by any suitable means into a mass of substantially uniform density, in which the solid or fiber particles are substantially uniformly distributed in the form of a stable or "frozen" framework or labyrinth. Continuous and batch operations will usually differ somewhat in this compression step, even though not in the extent of the compression. Thus, in a continuous operation the disintegrated material can be compressed or compacted, if desired, on the same conveyor further along in the tank in which it was saturated, by passing it between a pair of rolls, one of which may be one of the rolls supporting the conveyor and the other an overlying roll floating on the upper surface of the material and exerting the required pressure thereagainst either by its own weight or, more usually, by hydraulic or pneumatic actuation. Alternatively, the compression step can be conducted upon the material as it enters the apparatus or device in which the juice is displaced. Compression of the latter type is illustrated in FIGURE 2 in which the material is moved or transported through the displacement apparatus 1 by a pair of conveyors, one of which, designated as 2, feeds the material from the saturating tank or device 3 to the displacement apparatus and as it enters the latter turns about a guide or backup roll 4 supporting the lower end of the other conveyor 5. By regulating its tension, the feed conveyor 2 is caused to press the material between itself and the other or companion conveyor 5 against the backup roller or roll 4 and in process compress or compact the material to the desired extent. The saturating step, as well, can be performed on the material as it approaches the displacement station by lettering the juice displaced from a preceding increment flow through the material before drawing off the excess juice. Whatever the method of compressing, the rich juice in excess of that required to fill the interstices or voids will be expressed from the material by the compressing and, on being drawn off from a suitable sump or other receiver 6 underlying the compressing means, is available for use in saturating succeeding increments of the material.

The displacing apparatus or device 1, as in FIGURE 2, may be a closed-sided vessel, receptacle, container, or tower open at its top 7 and opening at is bottom 8 onto the sump 6. The illustrated vessel 1 is angled or inclined upwardly from its bottom 8 to its top 7 with the angle to the horizontal such that the vessel is substantially upright or vertically disposed. It is quite important that the compartment or passage 9 within the vessel 1 be of a cross-section suited to the form in which the material has been compressed, so that the precompressed blanket, mat or mass of the material as it enters the compartment will be maintained at substantially its initial compression or precompression and at the same time substantially completely fill or occupy the compartment laterally or transversely. To this end, the illustrated compartment 9 for the rectangular blanket into which the material is precompressed, is also rectangular in cross-section with one pair of its opposite sides or side walls 10 formed by corresponding sides of the vessel 1. The other pair of opposite sides of the compartment may be formed by the inner or confronting faces or upward or advance flights 11 of the conveyors 2 and 5, the conveyors being so arranged relative to the walls 10 as to leave no gaps or voids in the compartment, suitably by causing these flights to ride or slide directly on the side walls 12 of the vessel backing them. To ensure against slippage of the saturated and precompressed blanket of disintegrated material relative to the conveyors as the material passes on the conveyors 2 and 5 through the compartment 9, the conveyors may be provided with cleats, hooks, or fingers 13, the form and arrangement of which is such that they will engage and drive the material with a minimum of agitation of the liquid within the compartment.

Entering the bottom or feed end 8 of the compartment 9 in the vessel 1 as part of a solid mass of rich juice and bagasse or fibrous or solid material, the distintegrated material or substance is designed to be discharged from the top or outlet end 7 of the compartment as water-saturated bagasse or other solid. This transformation is accomplished by displacement of the rich juice by an equal volume of water, the water being introduced or injected through a water inlet 14 at or adjacent the outlet end 7 of the compartment, preferably in an amount sufficient to maintain that end portion flooded, and the displaced rich juice being drawn off at a juice outlet 15 at or adjacent the inlet or feed end 8.

If the juice withdrawn or extracted is to be in its rich, undiluted or natural state, the intermediate zone or interzone between the water and juice zones, as indicated in FIGURE 2, must be contained within the longitudinal limits of the compartment 9 between the water inlet 14 and juice outlet 15. With the displacement of the rich juice dependent upon the action of the water as a piston or column driven through the fibrous or solid matter of the blanket and pushing or displacing the raw juice before it, the driving force or pressure differential can be supplied by gravity, by applying positive or superatmospheric pressure at the water inlet or negative or subatmospheric pressure at the juice outlet or by a combination of these forces. To contain the interzone within the compartment, the rate at which the water is driven through the blanket relative to the rate at which the blanket moves in the opposite direction must be such as to produce no net movement of the water relative to the compartment and hold the water zone stationary therein. Otherwise, by accelerating or decelerating the rate of movement of the blanket above or below the equalizing or counter-balancing rate for a given driving force or pressure on the water, there would be obtained either a positive or negative net flow of water through the compartment, the former resulting in dilution of the extracted juice and the latter in incomplete displacement of the juice and discharge of a portion of it with the bagasse or other solid material. Even so, the cost advantage of the preferred "no net movement" continuous hydraulic extraction over the conventional pressing and macerating, in extracting juice from sugar cane without either using a long train of crusher mills or diluting the juice is very great. Wherefore, the present process would still be of advantage whether there were either a positive or a negative net flow of water through the displacement compartment due to the rate of relative movement of the blanket and the water and even if the interzone should grow beyond the inlet or both ends of the compartment, so long as the loss or cost of subsequently recovering any juice carried off in the bagasse and cost of removing any water added to the juice was less than the cost differential between the preferred and conventional processes.

A problem presented by the present process and somewhat more acute in its continuous than its batch form, is that thorough mixing and diffusion, essential to the diffusion process, are anathema to hydraulic displacement and even limited mixing and diffusion are necessary evils attendant the use of water as the displacing agent. These are the factors which control the initial length of the interzone. They, also, control the rate at which the interzone grows, albeit, absent mixing, the rate of growth will be quite low, since the compositions of the liquids at opposite sides of each boundary of the interzone will be substantially the same with practically no differential in sugar concentration to promote movement of the sugar molecules, the only diffusion that here can occur. In turn, the definiteness or integrity of the boundaries of the interzone which can be penetrated or by-passed and in effect destroyed if there are unfilled voids in the mass in any of the several zones, can also be destroyed by mechanical agitation of the contents of the displacement compartment sufficiently to cause the liquids in the zones to intermix.

Under the foregoing circumstances, it is highly desirable that mechanical agitation, exposure time, and temperature, the main variables affecting the extent of mixing and diffusion, be held to a minimum during the hydraulic displacement. Accordingly, in operating the continuous displacement apparatus 1 of FIGURE 2, it is preferred to minimize the mechanical agitation within the compartment 9 other than that necessarily incident to the counter-movement of the water and the blanket or mass of the juice-yielding substance and to the introduction of the water. Thus, the fingers 13 on the conveyors 2 and 5 for positively driving the blanket, as previously mentioned, are arranged and constructed to produce a minimum of turbulence by paddle effect and the water is introduced through a screen or other suitable dispersing device (not shown) so as not to agitate the mass in the compartment. Also, to reduce both the time for and rate of diffusion resulting from movement of sugar molecules across the boundaries of the interzone, the displacement preferably is conducted as rapidly as possible, the compartment 9 is unheated and the water is introduced cold.

As the flow sheet indicates, the water-saturated bagasse or other solid matter discharged from the displacement apparatus 1 is adaptable by dewatering for by-product use, the bagasse principally as a fuel, this ordinarily involving passing the matter between pressure rolls, such as those of a crushing mill, to express the water.

The practice of extracting juices by hydraulic displacement as a continuous process using suitable displacement apparatus, such as that shown in FIGURE 2, and with the relative movement of the water and the distintegrated substance produced by actual movement of the substance, may be preferred, especially in large-scale installations. However, it is also possible and practicable to practice the extraction as a batch process and displacement apparatus exemplary of that usable in such a process as shown in FIGURE 4. The displacement apparatus 16 shown in that figure is formed of a plurality of vessels, containers, or drums each for containing a batch of the disintegrated substance or material. These vessels, numbered in order, 16a, b, c, and d, are adapted to be connected in series, either as shown, one above the other or side by side, with the connection such that fluid will be discharged from the bottom 17 of one vessel into the top or upper end 18 of the next. The displacing water is applied to the first vessel 16a in the series by introducing or injecting it into the upper end 21 of that vessel in a manner not to disturb the batch within the vessel and in an amount sufficient to substantially fill or flood the vessel's upper portion.

In this form, it is downward movement of the water in the vessel rather than upward movement of the substance that produces the relative movement of the water and the substance upon which the displacement is dependent, and the water may be driven by gravity alone or gravity supplemented by positive pressure at the water inlet, negative pressure at the juice outlet or both. However, the effect is the same as in the continuous process, the water displacing the juice from the ruptured cells of the disintegrated material and pushing the juice before it toward the bottom of the vessel. With a foraminous or perforated plate 19 spaced above its bottom 17 to hold and prevent passage of the bagasse or other solid matter, the first vessel 16a discharges the liquid displaced from it by the water either, as shown, directly or through a connecting pipe into the upper end 18 of the next vessel 16b wherein the entering liquid displaces the juice from the ruptured cells of the substance in its batch. This procedure repeats itself for as many vessels as there are in the series.

Here again, the length of the interzone between the water and the juice zone will determine the length of the apparatus and the series therefore will include a sufficient number of the vessels 16a–d to contain the interzone. However, since it is the movement of the liquid rather than that of the disintegrated material relative to the vessels that accomplishes the displacement, rich or undiluted juice can be withdrawn from the last or end vessel 16d in the series only until the lower boundary of the interzone is reached. If the vessels are of substantially the same size and their number is sufficient to contain the interzone and permit the liquid content of the last or end vessel to be drawn off completely as rich juice, the first vessel at that time will be entirely within the water zone with practically no juice content. It then is but a matter of removing the first vessel, adding at the end of the series a vessel containing a new or fresh batch of the substance and introducing water into the top of the now first vessel to enable the next batch of rich juice to be extracted from the now end vessel. In the course of the transition, the new end vessel may simply be slid under the old or, if, as in the illustrated embodiment, the vessels, instead of being open bottomed below the perforated plate 19, have individual cut-off valves or pet cocks 20, flow of liquid from the old end vessel may be interrupted by turning off its valve while the new one is being added to the line.

While requiring periodic removal of the first vessel in the series and addition of a vessel containing a new batch at the end, the exemplary batch process is like unto the continuous process in the importance of saturating to fill the voids in the disintegrated substance with rich juice and compressing to stabilize the fiber content and obtain uniform density before the substance is subjected to the displacing action of the water. It is possible to saturate and compress or compact the batches of the substance before they are placed in the vessels, but more feasible to perform these steps within the vessels after they have been loaded with the batches by making the vessels and particularly their foraminous plates of sufficient strength and applying the pressure to compress the material to the desired extent by a ram or like suitable means.

Governed in its effectiveness by the same factors as the continuous form or process, the batch process is as capable as the continuous process of displacing substantially all of the juice available in the ruptured cells of the disintegrated substance in the form of undiluted rich juice. Too, it can continue to produce such juice so long as the interzone between the water and juice zones is contained within the displacement apparatus and even should the interzone grow beyond the end vessel, either a further vessel or vessels can be added to increase the displacement length sufficiently to contain the interzone, despite the latter's growth, or the original displacement length can be retained, in which case the extracted juice will be withdrawn from within the interzone and thus be of somewhat less sugar concentration than in the natural state. Even in the latter case, since the concentration will vary only with the rate of growth of the interzone and that rate under the contemplated controlled conditions is slow, over a given period the extracted juice, although somewhat diluted, will be within a comparatively narrow range of dilution.

As mentioned earlier, the interzones between the water and the rich juice, when water is used as the displacing agent, although finite and measurable, is of some length. This length will vary somewhat, depending upon the conditions under which the process is conducted and particularly with the time of exposure, temperature, and agitation primarily determinative of the extent of diffusion and mixing. However, with the agitation held to a minimum, the rate of growth of the interzone, due to the lack of substantial differentials in sugar concentration adjacent its boundaries, will necessarily be slow. That in any case the interzone will not only be of some but of considerable length is indicated by measurements made of it under laboratory conditions in which, with the water driven by gravity through a vertical column of disintegrated or comminuted sugar cane, the interzone between the water and the rich sugar juice measured between ten and twelve feet. It therefore is an interzone of considerable proportions that must be taken into consideration in displaying the rich juice by water.

Aside from the length of the interzone, tests conducted on sugar cane showed that after it had been disintegrated and saturated with rich juice, the disintegrated or prepared cane should be compressed to from two-thirds to one-half of its bulk volume to ensure stability of its fiber structure and uniformity of its density. Such reduction in volume will compress the disintegrated, fibrous material to a density on a dry-weight basis of from four to seven pounds per cubic foot and requires the application of a pressure of about three to nine pounds per square inch to the saturated material. With the material compressed to this range of fiber density and the water driven through the material only by gravity, the rate of flow of the water through the disintegrated material varied inversely with the density of the material and ranged between two and ten inches per minute, indicating that no net flow of water through the apparatus, when the displacement was conducted as a continuous process, could be obtained by moving the cane blanket at a corresponding rate in the opposite direction to the flow of water. In terms of capacity, the rate of relative flow of the water and cane blanket to process a given amount of cane will vary inversely with the cross-sectional area of the blanket. Thus, for the exemplary relative flow of four to twenty inches per minute, the cross-sectional area of the blanket required to process a ton of disintegrated cane per hour will vary from four to one square foot.

For conducting hydraulic displacement as either a batch or a continuous process, the existence of an interzone of some length between the water and rich juice zones renders it desirable that the liquid flowing through the disintegrated material be sampled periodically to signal any change in the interzone's boundaries. Especially when the displacement is conducted continuously, it further is desirable to determine periodically the position, as well as the length, of the interzone and this should be known as the process proceeds, if, as is preferred, there is to be no net flow of water through the apparatus. As the sugar concentration within the interzone increases substantially uniformly from its water to its juice boundary, the sugar content at the center of the interzone will be about one-half of that in the rich juice. Thus, by continuously withdrawing a sample of the interzone at the midpoint desired for the interzone in the apparatus, which usually will be a point substantially midway of the apparatus, and measuring the sugar content of the sample by electrical conductance or other suitable means, a comparison of that measurement with a like measurement of a control containing one-half the sugar content of the rich juice will determine whether the midpoint of the interzone is at or on the inlet or outlet side of the sampling point. If at any time such measurement indicates a need for shifting of the interzone within the apparatus, this can be brought about by changing one or more of the following variables controlling the interzone's position: (1) force applied to the input water; (2) angle of the apparatus relative to the horizontal; (3) precompression pressure; and (4) rate of movement of the cane blanket. Reduction of the first and second variables and increase of the third and forth will shift the interzone toward the water inlet end of the apparatus, while reversal of the change will shift it in the opposite direction.

Correspondingly, should the interzone grow beyond the displacement length to the point where the concentration of sugar in the extracted juice or the discharged solid matter reach predetermined limits of acceptability, a ready remedy to restore the interzone to initial length is to purge the displacement apparatus 1 or 16 of its then contents. In view of the slow rate of growth of the interzone under the intended conditions of operation, even so drastic a measure as complete discard of those contents would result in an inconsequential loss of juice relative to the total extracted.

From the above-detailed description, it will be apparent that there has been provided an improved process for extracting juice from juice-yielding material by which it is possible to extract substantially all of the available juice in rich or undiluted form on either a batch or a continous basis. It should be understood that the described and disclosed embodiment is merely exemplary of the invention and that all modificaitons are intended to be included which do not depart from the spirit of the invention or the scope of the appended claims.

Having described my invention, I claim:

1. A process for extracting juice by hydraulic displacement from ruptured cells of cellular plant material, comprising disintegrating said material to rupture juice-containing cells thereof, saturating said disintegrated material with undiluted juice, introducing said saturated material into an end portion of containing means as a column transversely filling said means, introducing water into an opposite end portion of said containing means, forcing said water longitudinally of said containing means through said material as a column coextensive transversely therewith for displacing said juice from said material and forming in advance of said water a water-juice interzone of substantial and finite length at least partly contained in said containing means, and withdrawing said displaced juice from said containing means at a point in advance of the water end of said interzone.

2. A process for extracting juice by hydraulic displacement from ruptured cells of cellular plant material, comprising disintegrating said material to rupture juice-containing cells thereof, saturating said disintegrated material with undiluted juice, compressing said saturated material into a mass of substantially uniform density, introducing said saturated material into an end portion of containing means as a column transversely filling said means, introducing water into an opposite end portion of said containing means, forcing said water longitudinally of said containing means through said material as a column coextensive transversely therewith for displacing said juice from said material and forming in advance of said water a water-juice interzone of substantial and finite length at least partly contained in said containing means, and withdrawing said displaced juice from said containing means at a point in advance of the water end of said interzone.

3. A process for extracting sugar juice by hydraulic displacement from ruptured cells of sugar juice-yielding cellular plant material, comprising disintegrating said material to rupture juice-containing cells thereof, saturating said disintegrated material with undiluted juice, introducing said saturated material into an end portion of containing means as a column transversely filling said means, introducing water into an opposite end portion of said containing means, forcing said water longitudinally of said containing means through said material as a column coextensive transversely therewith for displacing said juice from said material and forming in advance of said water a water-juice interzone of substantial and finite length at least partly contained in said containing means, and withdrawing said displaced juice from said containing means at a point in advance of the water end of said interzone.

4. A process for extracting juice by hydraulic displacement from ruptured cells of cellular plant material, comprising disintrgrating said material to rupture juice-containing cells thereof, saturating said disintegrated material with undiluted juice, introducing said saturated material into an end portion of containing means as a column transversely filling said means, introducing water into an opposite end portion of said containing means, forcing said water longitudinally of said containing means through said material as a column coextensive transversely therewith for displacing said juice from said material and forming in advance of said water a water-juice interzone of substantial and finite length at least partly contained in said containing means, withdrawing said displaced juice from said containing means at a point in advance of the water end of said interzone, and periodically purging said containing means of its contents substantially to preserve the initial length of said interzone.

5. A process for extracting sugar juice by hydraulic displacement from ruptured cells of sugar juice-yielding cellular plant material, comprising disintegrating said material to rupture juice-containing cells thereof, saturating said disintegrated material with undiluted juice, introducing said saturated material into an end portion of containing means as a column transversely filling said means, introducing water into an opposite end portion of said containing means, forcing said water longitudinally of said containing means through said material as a column coextensive transversely therewith for displacing said juice from said material and forming in advance of said water a water-juice interzone of substantial and finite length contained in said containing means, and withdrawing displaced juice from said containing means at a point beyond the juice end of said interzone.

6. A continuous process for extracting sugar juice by hydraulic displacement from ruptured cells of sugar juice-yielding cellular plant material, comprising disintegrating said material to rupture juice-containing cells thereof, filling open voids in said disintegrated material with undiluted juice, moving said material longitudinally through a container from an end portion thereof as a column transversely filling said container, introducing water into an opposite end portion of said container, forcing said water through said material counter the direction of movement thereof as a column coextensive therewith for displacing juice from said material and forming in advance of said water a water-juice interzone of substantial and finite length at least partly contained in said container, and withdrawing displaced juice from said container at a point in advance of the water end of said interzone.

7. A continuous process for extracting sugar juice by hydraulic displacement from ruptured cells of sugar juice-yielding cellular plant material, comprising disintegrating said material to rupture juice-containing cells thereof, filling open voids in said disintegrated material with undiluted juice, moving said material longitudinally through a container from an end portion thereof as a column transversely filling said container, introducing water into an opposite end portion of said container, forcing said water through said material counter the direction of movement thereof as a column coextensive therewith for displacing juice from said material and forming within said container in advance of said water a water-juice interzone of substantial and finite length, and withdrawing said displaced juice from said container at a point in advance of the juice end of said interzone.

8. A batch process for extracting sugar juice by hydraulic displacement from ruptured cells of a sugar juice-yielding cellular plant material, comprising disintegrating said material to rupture juice-containing cells thereof, filling each of a plurality of vertically disposed containers to a desired level with a batch of said disintegrated material, saturating each batch to fill open voids thereof with undiluated sugar juice, compressing each batch, connecting said containers in series with a bottom of one connected to a top of the next, flooding with water a top portion of the first container in said series, forcing said water through said batch in said first container as a column coextensive transversely therewith for displacing juice from said material in said containers and forming in advance of said water a water-juice interzone of substantial and finite length at least partly contained in said series, withdrawing displaced juice from the bottom of the last container in said series, subsequently connecting a container containing a fresh batch of saturated compressed material to an end of said series and disconnecting the first container from said series, and thereafter repeating the flooding, forcing, withdrawing and connecting and disconnecting steps on each new series.

9. A batch process for extracting sugar juice by hydraulic displacement from ruptured cells of a sugar juice-yielding cellular plant material, comprising disintegrating said material to rupture juice-containing cells thereof, filling each of a plurality of vertically disposed containers to a desired level with a batch of said disintegrated material, saturating each batch to fill open voids thereof with undiluated sugar juice, compressing each batch, connecting said containers in series with a bottom of one connected to a top of the next, flooding with water a top portion of the first container in said series, forcing said water through said batch in said first container as a column coextensive transversely therewith for displacing juice from said material in said containers and forming in advance of said water a water-juice interzone of substantial and finite length contained in said series, withdrawing displaced juice from the bottom of the last container in said series, subsequently connecting a container containing a fresh batch of saturated compressed material to an end of said series and disconnecting the first container from said series, and thereafter repeating the flooding, forcing, withdrawing and connecting and disconnecting steps on each new series.

References Cited by the Examiner

UNITED STATES PATENTS

| | | | |
|---|---|---|---|
| 97,059 | 11/1869 | DeLime | 127—3 |
| 246,900 | 9/1881 | Martin | 127—43 |
| 276,513 | 4/1883 | Wheeler | 127—5 |
| 416,108 | 11/1889 | Hyatt | 127—7 |
| 489,362 | 1/1893 | Bornholdt | 127—43 |
| 615,893 | 12/1898 | Perichon | 127—8 |
| 838,818 | 12/1906 | Spelman | 127—43 |
| 934,349 | 9/1909 | Philipp | 127—45 |
| 1,028,650 | 6/1912 | Wolff | 127—45 |
| 1,437,801 | 12/1922 | Graham | 127—45 |
| 2,581,175 | 1/1952 | DeLaCalle | 127—5 |
| 2,950,998 | 8/1960 | Stewart et al. | 127—7 |
| 3,047,430 | 7/1962 | Goodban et al. | 127—3 |

FOREIGN PATENTS 410,730  8/1932  Great Britain.

MORRIS O. WOLK, *Primary Examiner.*